July 7, 1959
C. J. McDOWALL ET AL
2,893,495
AIRCRAFT POWER SYSTEMS
Filed Dec. 12, 1952
3 Sheets-Sheet 1
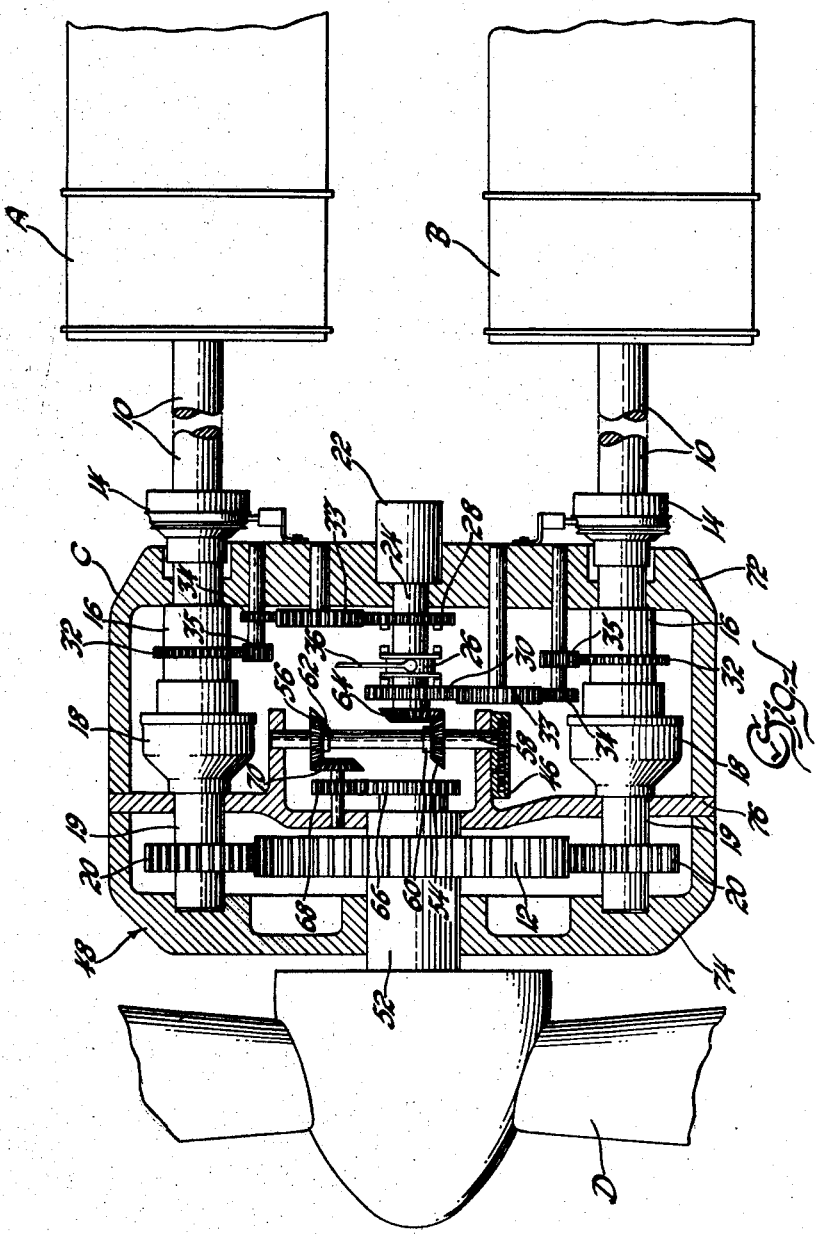
Inventors
Charles J. McDowall &
By Victor W. Peterson
Willits, Helmig & Baillio
Attorneys

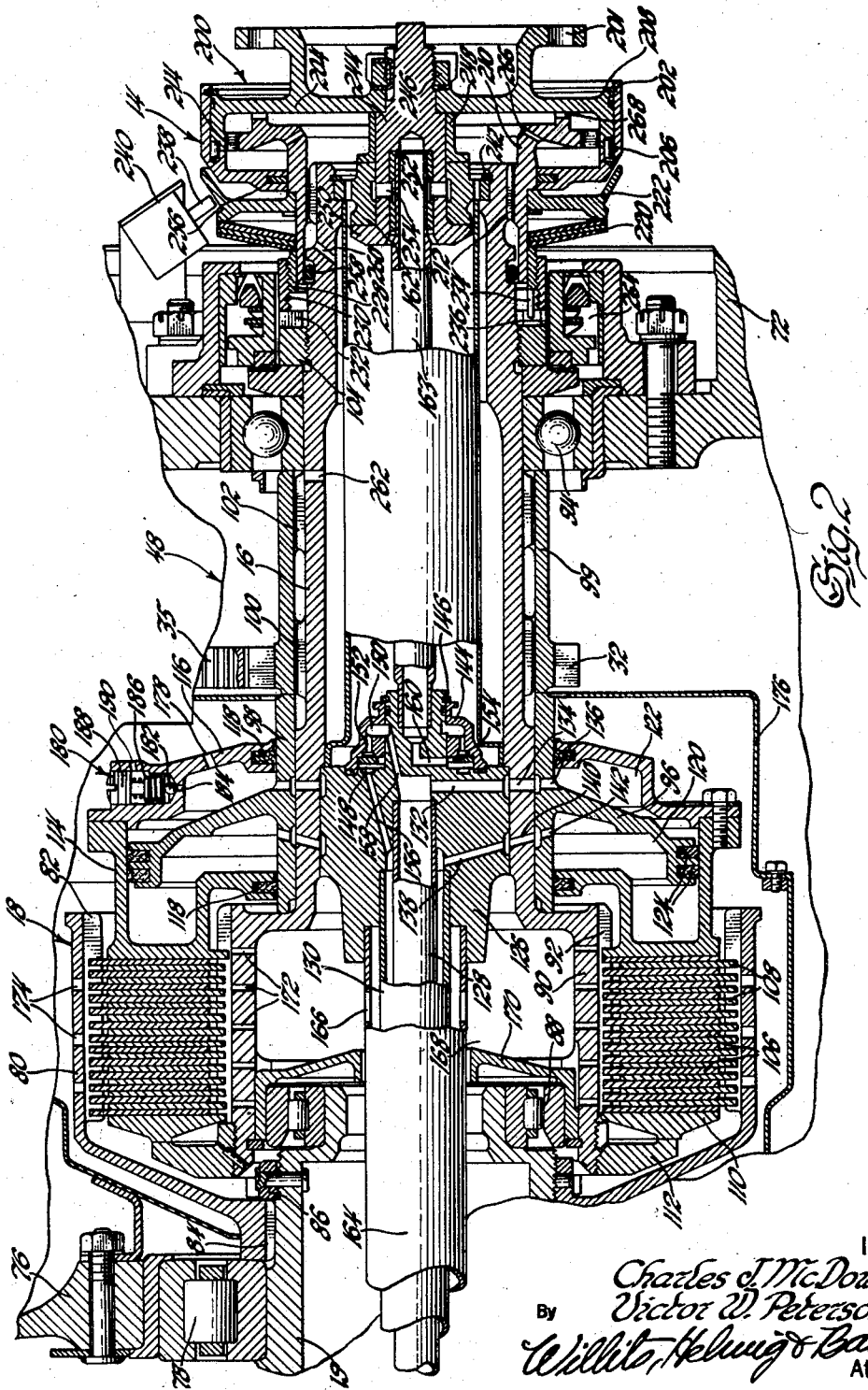

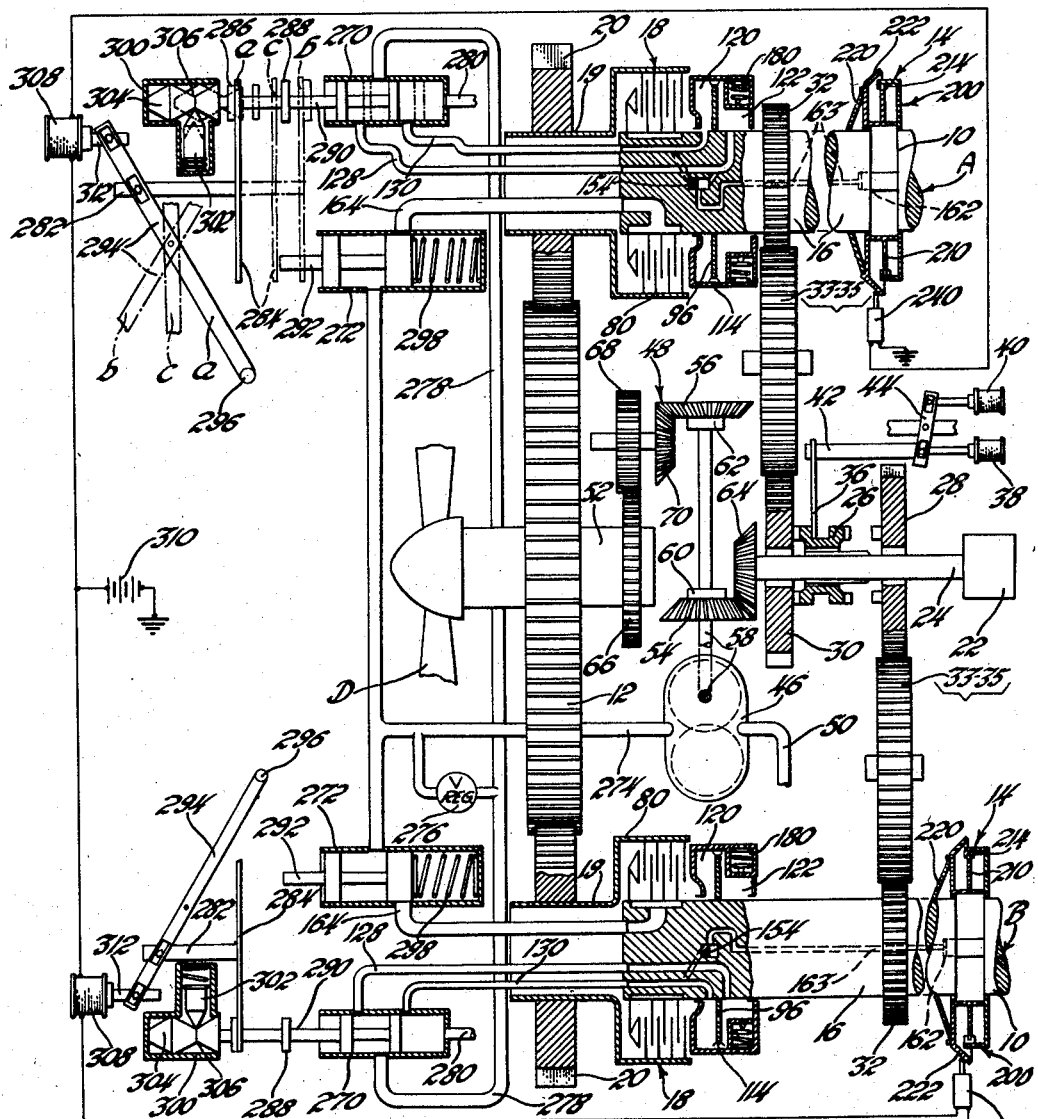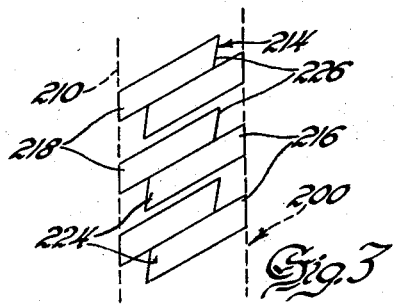

United States Patent Office 2,893,495
Patented July 7, 1959

2,893,495

AIRCRAFT POWER SYSTEMS

Charles J. McDowall and Victor W. Peterson, Indianapolis, Ind., assignors to General Motors Corporation, Detroit, Mich., a corporation of Delaware Application December 12, 1952, Serial No. 325,562

11 Claims. (Cl. 170—135.75)

This invention relates to power plants and more particularly to the transmission of power between an aircraft engine or engines and a propeller.

The invention is particularly applicable to aircraft power plant arrangements wherein a plurality of gas turbine engines of comparable power are coupled by clutches to a common propeller or propellers, although the principles of the invention may also be applied to single arrangements and to the transmission of power in many fields other than the field of aircraft propulsion. Multiple engine power plant arrangements are especially useful in aeronautics as best efficiencies during some flight conditions are obtained with one or more of the engines uncoupled and inoperative. Multiple engine arrangements are inherently safer than single engine arrangements and are therefore preferred for some types of aircraft operation.

When two gas turbine engines of comparable power are each clutched to a common propeller or propellers and there is a failure in one of the engines, it is essential that the failed engine be rapidly declutched to free the other engine. If the failed engine is allowed to remain coupled to the propeller, the failed engine will ordinarily absorb power from the propeller in addition to absorbing the entire output of the good engine. Under these conditions, the propeller moves into low pitch in an effort to maintain speed and it absorbs power from the forward motion of the aircraft to help drive the failed engine. The resulting drag on the aircraft is likely to cause the pilot to lose control before he can declutch the failed engine. The danger of control loss is even more pronounced in a single engine arrangement. The drag resulting from a failed gas turbine engine in tenfold that of a comparable piston engine and the failure of a gas turbine, unlike the failure of a piston engine, is difficult to detect on the normal engine supervisory instruments provided for the pilot.

The invention provides for individually clutching each engine to the propeller by two clutches in series, one clutch being a hydraulically operated friction type clutch that is normally under manual control and the other being a normally engaged positive jaw type safety clutch that is automatically disengaged by substantial reverse torque, which disengagement automatically disengages the friction clutch. Either engine may be started with the friction clutch disengaged, and may then be clutched by it to the propeller. With one engine operating, the other engine may be clutched by its friction clutch to the operating engine and started thereby, either on the ground or in flight. Also, the power sections may be started in flight by clutching them to the propeller to derive power from the windmilling of the propeller.

The principal objects of the invention are to provide an improved power plant of the turboprop type, particularly one with multiple power units; to provide improved reduction gearing, clutching, and starting arrangements for such power plants; to improve the control systems for starting such power plants and clutching them to the load; and to provide an improved clutching arrangement wherein the high drag of a failed power unit will effect a rapid uncoupling of the same from the propeller to prevent a loss of control over the aircraft.

The preferred manner in which the stated objects are achieved, the advantages of the invention, and many further objects of the invention will be apparent to those skilled in the art from the appended description of the preferred embodiment of the invention.

Referring to the drawings:

Fig. 1 is a somewhat schematic representation of the general arrangement of a power plant incorporating the invention;

Fig. 2 is a partial sectional view of the power transmission structure, the section being taken along the axis of one of the engine shafts and particularly illustrating the clutching mechanisms;

Fig. 3 diagrammatically illustrates the operation of the safety clutch, and

Fig. 4 is a schematic diagram of the invention.

Referring to Fig. 1, this figure illustrates a power plant comprising two gas turbine engines or power units A and B arranged side by side and coupled through a reduction gear transmission C to the variable pitch propeller D. The details of the internal structure of the engines and propeller are immaterial to the invention. Each of the engines is of a known type comprising a turbine to power the propeller, a combustor to deliver hot gas to the turbine to drive the same, and a compressor driven by the turbine to deliver air to the combustor for fuel admixture and combustion. The propeller is of a known type having a variable pitch control including feathering control.

The engines A and B are of the same power rating and deliver power to the propeller D through identical clutching arrangements. Each engine's power output shaft 10 connects to the common propeller bull gear 12 through a safety clutch 14, an intermediate shaft 16, a friction clutch 18, a pinion shaft 19, and a pinion 20. A starter motor 22, including an overrunning clutch or the equivalent, drives a shaft 24, on which is splined a sliding toothed clutch element 26, which may be engaged with mating clutch elements of either of two gears 28 and 30, rotatable with respect to the shaft 24. The gears 28 and 30 are coupled to gears 32 on the intermediate shafts 16 through gears 33, 34 and 35.

Referring additionally to Fig. 4, the starting clutch 26 may be shifted to couple the starter with either gear 28 or gear 30 by appropriate mechanism such as a sliding fork 36 actuated into either extreme position by solenoids 38 and 40, respectively, which may be energized by a suitable circuit (not shown). The armature of solenoid 38 may be coupled directly to the shifting fork by rod 42 and the armature of solenoid 40 may be coupled to the rod 42 by a lever 44. An overcenter detent mechanism (not illustrated) may be provided to maintain the clutch 26 in either position of engagement.

The friction clutches 18 are engaged and disengaged by a hydraulic system and are supplied with oil for cooling. Oil for both these purposes is supplied by a pump 46 supplied from the sump of the transmission housing 48 through a conduit 50. The pump 46 may also supply oil to the reduction gear and to the safety clutches 14. The pump 46 is driven by the starter shaft 24 or the propeller drive shaft 52, being coupled to both these through overrunning clutches and suitable gearing. The illustrative gearing shown comprises bevel gears 54 and 56 coupled to the pump shaft 58 by overrunning clutches 60 and 62 respectively, gear 54 being driven by a bevel gear 64 on the starter shaft 24 and gear 56 through a gear train comprising gear 66 on shaft 52 and intermediate gears 68 and 70 on an idler shaft. The ratios of the gears are preferably so selected that when the propeller is clutched to the power unit the pump is driven by the propeller and clutch 60 overruns slightly. The pump 46 supplies oil to a friction clutch actuating valve 270 and a friction clutch cooling valve 272 for each engine through conduit 274 and suitable valves and conduits to be described.

Before proceeding to the description of these valves and the control systems therefor, the structure of the clutches 18 and 14 will be described with reference particularly to Fig. 2. Fig. 2 illustrates the clutching arrangement of either of the engines and includes the clutch 14 which couples the engine output shaft to the intermediate shaft 16 which, in turn, is coupled by the clutch 18 to the pinion shaft 19 to drive the propeller. The starter gear 32 which is splined to shaft 16 and a portion of the idler gear 35 are shown.

The clutching arrangements are supported by the housing 48, shown more fully in Fig. 1, which includes the clutch housing 72, the reduction gear housing 74 and a transverse plate 76 bolted between the housings 72 and 74. The pinion 20 is integral with the hollow pinion shaft 19 which is mounted in a bearing 78 in the plate 76 and a suitable bearing in the housing 74. The driven member 80 of the clutch 18 is in the form of a drum and is provided with internal splines 82. The member 80 is formed with a flange that is splined to the shaft 19 at 84 and retained thereon by the threaded ring 86. The shaft 19 is formed with a reduced end portion on which is mounted a bearing 88 that supports the driving clutch element 90 rotatably on the shaft 19. The driving clutch element 90 is of cylindrical form and is provided with splines 92 on its outer surface which constitutes an enlarged end portion of the intermediate shaft 16. Shaft 16 is further mounted in a bearing 94 at the end wall of the housing 72.

The annular piston 96 of the clutch actuating cylinder has a sleeve oprtion 98 piloted on the shaft 16 which abuts the end of the driving clutch element 90 and sleeve 99 splined on the shaft 16 at 100 and 102. The sleeve 99 is in turn abutted by the inner race of the bearing 94, and the whole assembly is retained on shaft 16 by a spanner nut 104. The starter gear 32 is integrally formed on the sleeve 99 to rotate with the intermediate shaft 16. The intermediate shaft 16 projects through the rear wall of the housing 72 and supports the safety clutch 14 to be described.

The clutch 18 is of the multiple-disk type and is provided with two sets of disks disposed alternately, the disks 106 of the driving set being formed with internal splines that are engaged with the splines 92 of the driving clutch element 90, and the driven clutch disks 108 being formed with external splines that are engaged with the splines 82 of the driven clutch element 80. The innermost of the driving clutch disks is backed up by a ring 110 which bears against an annular flange 112 threaded on the forward end of the driving clutch element 90. The clutch disks are pressed into engagement by an annular cylinder 114 which reciprocates on the outer surface of the sleeve 98. Cylinder 114 is fitted with a head 116 and the ends of the cylinder are provided with oil seals 118 engaging the sleeve 98. The cylinder 114 is divided into two chambers 120 and 122 by the fixed piston 96 which is provided with oil seals 124 around its circumference. As will be apparent, when oil under pressure is admitted to the front chamber 120 the clutch disks are engaged; and when oil is admitted to the rear chamber 122 the clutch is released.

With the safety clutch 14 in positive engagement and the hydraulic clutch disks in frictional engagement, power is transmitted from the engine output shaft 10 to the intermediate shaft 16 and the driving clutch member 90 thereon and through the frictional contact of the disks to the driven clutch member 80, pinion shaft 19 on which it is mounted, and the pinion 20 to drive the bull gear 12 which powers the propeller D. When in flight, the rotation of the propeller may drive back at low reverse torque through the clutches 18 and 14 to bring the engine up to starting speed, but may not drive back through the clutch 14 at high reverse torque, as will be seen.

Hydraulic operating fluid for the friction clutch is supplied through a plug fitting 126 pressed into the end of the shaft 16 and concentric slip tubes 128 and 130 extending from the fitting 126 to a non-rotating bushing (not shown) in the forward wall of the gear housing 74. The plug 126 rotates with the shaft 16 and the tubes float in the plug and gear housing bushing to permit free rotation of the shaft. Oil to release the clutch 18 is conducted through the tube 128 and radial passages 132 in the plug 126, 134 in the shaft 16 and 136 in the piston sleeve 98. Circumferential grooves are provided in the outer surface of the plug 126 and the inner surface of the sleeve 98. Oil to engage the clutch 18 is transmitted through the tube 130 and radial passages 138, 140 and 142 in the plug 126, shaft 16 and piston sleeve 98, respectively, in a similar manner.

An annular fitting 144 is secured on the rear stub end of the plug 126 by a C-ring 146. The fitting 144 and the plug form annular chambers 148 and 150 which connect by longitudinal passages 152 in the fitting. A ring valve 154 is reciprocably received in the chamber 148 and is shifted automatically by clutch engaging oil from the plug passage 156 and by clutch disengaging oil from the plug passage 158 to deliver oil to the plug outlet passage 160 whenever the power plant is operative. The plug passage 160 delivers oil to the safety clutch journal bearing 162 through a slip tube 163. The ring valve 154 shifts in the chamber 148 to cut off either of the oil passages 152 and 156 to prevent oil transfer between the disengaging oil tube 128 and the engaging oil tube 130 without terminating the oil supply to the safety clutch bearing.

Cooling oil for the clutch 18 is supplied through the slip tube 164, one end of which floats in a recess in the plug 126 and the other end of which floats in a non-rotating bushing (not shown) in the forward wall of the gear housing 74. Passages 166 in the tube 164 discharge the cooling fluid into an annular chamber 168 defined by the driving clutch member 90, the plug 126, and a disk 170 mounted in the driving clutch member. When oil is supplied to the chamber 168, centrifugal force drives the oil through radial passages 172 in the driving clutch member which discharge the oil between the clutch disks 106 and 108 which may be surface grooved in a known manner. The driven clutch member 80 is formed with outlets 174 through which the oil is vented into the oil pan 176 for transfer to the oil sump.

The disengagement chamber 122 is formed with a restricted vent outlet 178 spaced from the sleeve 98. After the disengagement oil is shut off, the chamber 122 is partially drained through the orifice 178, leaving fluid in this chamber only radially outward from the outlet. This diminishes the centrifugal effect against the cylinder head 116 thus increasing the clutch-engaging force.

The cylinder head 116 is also provided with a spring-loaded relief valve 180 which further vents the oil from the disengaging chamber 122 when the assembly approaches full speed as, for example, at 14,000 r.p.m. The relief valve may be of conventional construction and may be mounted in a boss on the cylinder head. In its preferred form, the valve comprises a ball 182 seating against a radial opening 184 in the cylinder head and held seated by a spring 186 abutting a retainer 188. When the centrifugal force reaches the desired level, the combination of centrifugal force on the valve parts and on the oil lifts the ball 182 from the seat and vents the oil through the passage 184 and an outlet 190 in the valve body. The entire chamber 120 is filled with oil but only the outer portion of the chamber 122 is filled when the friction clutch is engaged so unbalanced hydrostatic force due to centrifugal action helps to hold the clutch engaged. The parts are so proportioned that this effect is sufficient to retain the clutch 18 engaged during normal operation even though the pressure in the hydraulic fluid supply system be lost.

The safety clutch 14 provides an immediate separation between a failed power section and the propeller bull gear whenever a reverse torque above a preset valve is applied to the failed power section. The separation or disengagement of the safety clutch actuates a switch 240 which effects disengagement of the failed engine's friction clutch and shuts off the failed engine's fuel supply.

The engine output shaft 10 is suitably bolted to the safety clutch driving coupling member 200 at 201. The driving coupling member includes an outer annular member 202 and a head member 204 secured together by the pins 206 and C-ring 208. A driven coupling sleeve 210 is slidably received in the interior of the driving coupling member 200 and is splined to the intermediate shaft 16 at 212 for axial movement thereon. The driving member 200 and the driven sleeve 210 are normally clutched together by helical splines 214 which comprise internal jaw teeth 216 on the head member 204 and external jaw teeth 218 on the sleeve 210, as may be seen diagrammatically in Fig. 3. Three conical spring washers or Belleville springs 220 press against an annular cam plate 222 mounted on the driven sleeve 210 to keep the jaw teeth positively engaged except in the event of an engine failure at operational speeds.

The particular safety clutch illustrated is adapted for engines having counterclockwise rotation (looking at the engine from its rear end) so left-hand helical splines are provided. When power is transmitted through the safety clutch from the engine, the cylinder 200 and sleeve 210 rotate as a unit. When power is transmitted through the safety clutch to the engine, the helical splines 214 generate a separating force proportionate to reverse torque which force tends to move the sleeve 210 forwardly against the resistance of the Belleville springs 220. If the reverse torque is of sufficient degree, the jaw teeth 218 move forwardly and out of positive clutching engagement with the jaw teeth 216. Fig. 3 illustrates an intermediate point in such a disengaging movement. Ratcheting occurs between the overriding ends 224 and 226 of the jaw teeth 216 and 218 when they move out of positive clutching engagement with each other. The overriding ends 224 and 226 are relieved with a suitable ramp angle to facilitate ratcheting. In the particular helical spline arrangement illustrated, the teeth faces are formed with a 28-degree helix angle and the overriding ends of the teeth are formed with an 8-degree ramp angle.

The amount of reverse torque that may be transmitted through the safety clutch without decoupling depends primarily upon the helix angle of the jaw teeth and the resistance offered by the Belleville springs. The helix angle and spring force are so related that a substantial amount of reverse torque may be transmitted through the clutch without effecting its decoupling so that reverse starting torques may be transmitted to the engine. Certain flight situations also may generate reverse torques through the clutch which should not effect its decoupling; for example, high speed landings at relatively low engine power settings, because of propeller windmilling. These reverse torques wherein decoupling is not desired are substantially less than the reverse torques that occur with engine failures at operational speeds and may therefore be accommodated without compromising the safety function of the clutch.

The particular arrangement illustrated is designed to decouple a failed engine from the power plant when the failed engine absorbs approximately 15% of its rated horsepower at operational speed. The decoupling setting may, of course, be varied in accordance with the requirements of any particular power plant, but it should be at least high enough that starting torques may be transmitted. An axially adjustable abutment for the Belleville springs is provided to compensate for dimensional variations of the parts as manufactured, and it should be obvious that the decoupling setting may be varied by changing the number of springs and/or helix angle.

The inner rims of the Belleville springs 220 abut against an inner sleeve 228 that is externally threaded to an internally threaded outer sleeve 230. The outer sleeve 230 abuts against the axially projecting teeth 232 of the spanner nut 104 and the sleeves are provided with locking tangs 234 and 236 that engage between the nut teeth 232. The sleeves 228 and 230 comprise an axially adjustable abutment for minor adjustments of the preloading setting of the Belleville springs. The helical splines 214 are preferably loaded by Belleville springs because their spring force diminishes as they flatten out and overcenter under the separating force generated by the splines. This force-diminishing characteristic of the Belleville springs insures a rapid decoupling of the safety clutch whenever design decoupling reverse torque is attained and considerably reduces spring loading during ratcheting. In the illustrated embodiment, the spring loading during ratcheting is only 10 to 20% of the spring loading during full engagement because of this force-diminishing characteristic. The Belleville springs have a cone height over wall thickness ratio between the square root of two and the square root of eight so that the spring loading that resists reverse torque decoupling will gradually increase to a maximum value and then decrease to a minimum value and the safety clutch is so proportioned that ratcheting will occur at the minimum value.

In the event of an engine failure, the high drag of the failed engine immediately effects automatic decoupling of the safety clutch 14 which ratchets and allows the engine to coast to rest. The sleeve 210 is shifted sufficiently during ratcheting to cause the outer surface of the cam plate 222 to engage the reciprocable lever 238 of the microswitch 240 to actuate the same. The microswitch 240 transmits an electrical signal to shut off the fuel to the failed engine through a suitable valving arrangement (not shown) and to disengage the failed engine's friction clutch 18 through means to be described. The cam plate 222 may trigger the switch 240 slightly ahead of actual ratcheting, if desired, but ratcheting will still occur because of the time lag in declutching the friction clutch 18.

The safety clutch insures decoupling of the failed power section without reliance upon the electrical and hydraulic systems of the aircraft and provides for automatic declutching of the manually controllable clutch 18. The friction clutch 18 is preferably disengaged by the decoupling of the safety clutch 14 to prevent prolonged ratcheting therein which would eventaully destroy it. After clutch 18 disengages, the ratcheting drag reduces the speed of the intermediate shaft 16 to approximately that of the failed engine (which may be coasting to rest at low r.p.m. or be at rest) and the spring loading of the clutch 14 effects positive re-engagement of the jaw teeth.

In some designs, the drag of the friction clutch 18 while running disengaged may exceed a desired low ratcheting drag of the safety clutch 14 and in such cases the remainder of the power plant may be momentarily shut down at an opportune time to effect re-engagement if a lengthy operation of the remainder of the power plant after a decoupling is desired. The safety clutch cam plate 222 may be adapted to engage a brake upon decoupling movement to augment the low ratcheting drag and eliminate the necessity for a shutdown in these designs, if desired.

The engine output shaft 10 is supported at its forward end by the safety clutch 14, the safety clutch is supported by the intermediate shaft 16, and the bearing 94 provides support on the rear wall of the clutch housing 72 for the intermediate shaft. The journal bearing 162 and the spline connection 212 support the safety clutch on the intermediate shaft 16. The journal bearing 162 is secured in the shaft 16 by a C-ring 242. A small shaft 244 is secured to the cylinder head 204 by a spanner nut 246 and is provided with a sleeve 248 and a flanged end 250 that embrace the ends of the journal bearing 162 so that the bearing may take both the radial and the thrust loads that result from ratcheting of the safety clutch. The journal bearing 162 is lubricated whenever the power plant is operative by either engaging or disengaging oil from the friction clutch 18 through the radial passages 252 in the slip tube 163 and the radial passages 254 in the small shaft 244. The journal bearing 162 is so designed as to have sufficient oil leakage to fill the interior of the cylinder 200 during power plant operation, and the safety clutch is provided with sealing rings 256 and 258 so that the leakage oil may escape only into the interior of the intermediate shaft 16 through an intermediate shaft vent hole 260. The leakage oil is exhausted from the interior of the shaft 16 through a radial passage 262 in the shaft to lubricate the bearing 94 and an oil seal 264 of conventional design prevents the leakage oil from escaping out of the clutch housing 72. The leakage oil in the cylinder 200 is under centrifugal pressure as a result of its rotation, and this pressure tends to move coupling 210 in opposition to the Belleville springs 220 as a result of the unbalanced pressure on the coupling (the unbalanced pressure being determined by the thickness of the sleeve portion of the coupling). The coupling 210 is provided with radial passages 266 and 268 to circulate the leakage oil between the sides of the flange portion of the coupling.

The centrifugal hydraulic force is negligible with respect to the Belleville spring force (approximately one-tenth thereof) when the safety clutch is coupled. The centrifugal hydraulic force diminishes appreciably when the safety clutch ratchets for the cylinder 200 comes to rest with the engine shaft 10, but the coupling teeth 218 function as pump blading during ratcheting for the coupling 210 continues to rotate with the intermediate shaft 16 so that the net hydraulic force on the coupling remains substantially constant. It should be apparent from the drawings and preceding description that the spline teeth 216 and 218 project radially from the cylinder 200 and sleeve 210 and at a 28 degree angle to the rotational axis of the clutch so that they form crude axial flow stator and rotor blading during ratcheting disengagement as occasioned by an engine failure. During such ratcheting disengagement the rotating spline teeth 218 pump oil from the forward portion of the cylinder 200 and in a rearward direction against and through the stationary splined teeth 216 and this hydraulic pumping force urges the splined teeth out of engagement. The oil leaves the aft portion of the cylinder and returns to the forward portion of the cylinder for recirculation under the pumping action of the spline teeth by way of the radial passages 266. Since the Belleville spring force during ratcheting is diminished to approximately one-fifth of its force while coupled, the ratio between the hydraulic force on the coupling or piston 210 and the spring force will be changed during ratcheting so that the hydraulic force is appreciable (approximately one-half) with respect to the Belleville spring force thereby further reducing ratcheting drag to prolong the life of the clutch teeth.

Proceeding to a description of the control system for the clutches with reference to Fig. 4, it should be noted that the clutches 18 and 14 are shown in a schematic fashion in this figure. However, the relation of the schematic to the physical structure shown in Fig. 2 will be apparent to those skilled in the art, particularly in view of the identification of the principal elements of the clutches by reference numerals in Fig. 4.

As previously stated, the pump 46, which is operated whenever either the power unit to which the starting shaft 24 is clutched or the propeller drive shaft 52 is rotating, supplies fluid to an actuating valve 270 and a cooling control shaft 272 for each of the clutching arrangements. The controls for the two clutching arrangements are identical. It will be understood that the fluid supply system is provided with relief or unloading valves (not shown), which may be of conventional type, and that the pump 46 may supply lubricating oil under pressure to the gears and bearings in any suitable manner in addition to supplying oil to the clutches. The valves 270 and 272 may be of the well-known spool type, as illustrated, or any other suitable type.

The line 274 from the pump branches and communicates directly with the coolant control valves 272. The engagement control valves 270 are supplied from line 274 through a pressure-regulating valve 276 of any suitable type and branch conduits 278. The purpose of the regulating valve is to ensure substantially constant low oil pressure for soft engagement and disengagement. By way of example, in the preferred embodiment of the invention, the normal output of pump 46 is about 180 pounds per square inch. When cooling oil is supplied to the clutch the large flow of coolant reduces the pressure to about 40 or 50 pounds per square inch. The output of valve 276 is about 20 pounds per square inch and is thus substantially independent of fluctuations in pump output pressure.

The system is illustrated in Fig. 4 in condition for starting one unit with the clutches 18 disengaged, the clutches 14 engaged, and the starter 22 clutched to the intermediate shaft 16 of the power unit A. Under these conditions, flow of fluid from the pump is cut off at the valves 272 and is directed to the disengagement chambers 122 by the valves 270. The engagement chambers 120 are vented to the oil sump through return line 280.

The actuating valve 270 and the cooling valve 272 for each clutch 18 are both operated by a common mechanism. This mechanism includes a rod 282, guided for reciprocating movement, on which is mounted a plate 284. The plate 284 is formed with a fork engaging with lost motion between enlargements 286 and 288 of the plunger shaft 290 of valve 270. The plate 284 also engages the end of the plunger 292 of the valve 272. Rod 282 is reciprocated through a pin and slot connection by a pivoted lever 294 which may be actuated by the pilot in any suitable manner, as by a handle 296.

When the lever 294 is in the solid line position indicated by a, valve 270 is held in the clutch-releasing position in which fluid from the supply line 278 is supplied through the conduit 128 to the releasing chamber 122 of the clutch 18 and the clutch-engaging chamber 120 is vented through conduit 130 to the return line 280. In this position the plate 284 is clear of the stem 292 of the coolant supply valve 272 and this valve is held closed by a spring 298. The safety clutch oil supply valve 154 is held in the indicated position by the pressure in the conduit 128 and fluid is supplied through the conduits 128 and 163 to the journal bearing 162 and the cylinder 200 of the safety clutch 14.

To engage the clutch 18 of the power unit A, for example, the lever 294 is rotated to the position indicated as b, shifting the plate 284 to the b position. The connections to the chambers 120 and 122 are reversed, chamber 120 being filled through conduit 130 to engage the clutch 18 and chamber 122 being vented through conduit 128 to the open end of the valve 270 which may be connected to an oil sump return line (not shown). The valve 154 is shifted to the right by the pressure in the conduit 130 and fluid is supplied through the conduits 130 and 163 to the journal bearing 162 and cylinder 200 of the safety clutch 14. In the b position, the coolant valve 272 is opened against the force of the spring 298 to supply cooling fluid to the clutch 18.

When the propeller has been brought up to speed, the actuating lever 294 and thereby the plate 284 are shifted to the c position in which the spring 298 closes the valve 272 to shut off the cooling fluid. Valve plunger 290 is retained in the clutch-engaging position because of the lost motion between the plate 284 and the enlargements 286 and 288 on the plunger and the action of a detent mechanism 300 including a spring-urged detent 302 cooperating with the tapered surface 304 of the valve plunger 290. The safety clutch 14 continues to receive fluid from the conduit 130.

To disengage the clutch 18, the lever 294 is moved back to the initial or *a* position, which shifts the plunger 290 so that the detent 302 engages in the notch 306, venting the clutch-engaging chamber 120 through the conduit 130 and supplying fluid under pressure to the releasing chamber 122 and the safety clutch 14 through the conduit 128.

As is apparent it is possible for the pilot or engineer of the aircraft to control the clutches 18 directly by manual actuation of the levers 294, and it will also be apparent that some form of remote control operating mechanism for the levers 294 could be installed if desired. Since the details of such remote actuating means are not material to the present invention, it is deemed preferable in the interest of conciseness to omit a description of such remote controls.

In practice, however, whether the operation of the levers 294 be by direct or by remote control, it is highly desirable to include automatic controls to actuate the friction clutch controlling valves to disengage the friction clutches in response to the high drag or reverse torque that accompanies an engine failure.

The exemplary control system for each friction clutch (illustrated in Fig. 4) comprises the safety clutch actuated microswitch 240 and a solenoid 308. The microswitch 240 is closed by a forward decoupling movement of the cam plate 222 to energize the solenoid 308 from a battery 310. The clutch controls lever 294 connects to the solenoid armature 312 by a pin and slot connection and solenoid energization actuates the control lever 294 to the clutch disengaging position *a*. The solenoids 308 may be utilized to cut off each engine's fuel supply through suitable valving (not shown) when energized, or separate solenoids may be provided if desired.

Although it is believed that the manner of operation and characteristics of the system disclosed herein will be apparent to those skilled in the art from the foregoing, the operation may be reviewed briefly.

Assuming that both engines are standing idle, the clutch 26 is shifted to couple the starter to either power unit. As the engine is accelerated by the starter, its operation becomes self-sustaining and it develops sufficient power to assume the propeller load. The safety clutch remains engaged and the solenoid 308 de-energized while starting so the lever 294 may be operated to the *b* position to shift the valves 270 and 272 to engage the friction clutch and supply cooling oil thereto. When the propeller has been accelerated to idle or intermediate speed, the lever is released and spring 298 shifts it to the *c* position to shut off the coolant, the valve 270 remaining in the clutch-engaging position.

With one power unit in idle or intermediate speed operation, the friction clutch of the inoperative power unit is engaged by its lever 294 and the inoperative unit is brought up to speed by the operative unit through the previously engaged friction clutch and the intermediate gearing. The safety clutch of the unit being started remains coupled as it is disengaged only by an amount of reverse torque greater than starting torque as previously noted. The inoperative power unit may also be started by the starter instead of the operative power unit if desired. Disengaging reverse torque might be generated if the friction clutch of the inoperative power unit were engaged with the operative power unit at full speed but the engaging slip of the friction clutch is sufficient to prevent disengaging reverse torque generation at intermediate speeds. Starts with the starter motor 22 are accomplished without safety clutch disengagement as the power capacity of the starter motor is not large enough to generate disengaging reverse torque. It might be noted again that the amount of reverse torque required to disengage the safety clutch according to the invention is substantial as it is predicated upon an engine failure, for example, jamming of the compressor or turbine blading or a failure in the combustor fuel supply.

In flight, when power demand is reduced, either power unit may be declutched by its friction clutch and stopped, the propeller being driven by the operating unit. Both the power units may be shut down during flight (as might be desirable on a multi-powerplant aircraft) and restarted by unfeathering the propeller and allowing it to windmill freely to an intermediate speed whereupon the friction clutches may be engaged and the power units brought up to firing speed by the action of the apparent wind on the propeller and the blading of the power units.

In the event of a power unit failure, the failed unit absorbs sufficient power from the other unit and/or propeller to disengage its safety clutch and cut off its fuel supply. Disengagement of the failed unit's safety clutch effects automatic disengagement of its friction clutch and the safety clutch then re-engages as the failed unit slows to rest, the compressor inlet of the failed unit being closed to prevent any windmilling of its blading.

The safety clutch prevents a loss of pilot control over the aircraft, especially during landings and take-offs, as may result from the enormous drag of a failed engine by automatically disengaging the same.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

We claim:
1. A power transmission unit for clutching a normally driving shaft with a normally driven shaft comprising an annular cylinder having a liquid therein and rotatable with said driving shaft, an annular piston reciprocable in said cylinder and rotatable with said driven shaft, internal jaw teeth in said cylinder and external jaw teeth on said piston adapted for engagement and disengagement with each other on reciprocation of said piston, said jaw teeth being biased to engagement by a spring and biased to disengagement by a hydraulic force generated by said liquid, said piston being self-biased out of positive tooth engagement and into tooth ratcheting disengagement against said spring by a substantial predetermined torque application to said driving shaft from said driven shaft, said spring being of conical configuration whereby its force diminishes appreciably as said clutch moves from engagement to disengagement to lessen jaw teeth ratcheting wear, said hydraulic force being less than said spring force when said clutch is engaged and disengaged but not subject to appreciable decrease during ratcheting disengagement whereby jaw teeth ratcheting wear is further lessened.

2. A power transmission unit for clutching a normally driving shaft with a normally driven shaft comprising an annular cylinder having a liquid therein and rotatable with said driving shaft, an annular piston reciprocable in said cylinder and rotatable with said driven shaft, internal jaw teeth in said cylinder and external jaw teeth on said piston adapted for engagement and disengagement with each other on reciprocation of said piston, said jaw teeth being biased to engagement by a spring and biased to disengagement by a hydraulic force generated by said liquid, said jaw teeth being helically formed so as to be self-biased out of positive engagement and into ratcheting disengagement against said spring by a substantial predetermined torque application to said driving shaft from said driven shaft, said spring being of conical configuration whereby its force diminishes appreciably as said clutch moves from engagement to disengagement to lessen jaw teeth ratcheting wear, said hydraulic force being less than said spring force when said clutch is engaged and disengaged but not subject to appreciable decrease during ratcheting disengagement whereby jaw teeth ratcheting wear is further lessened.

3. An aircraft propulsion plant comprising a propeller assembly, a gas turbine engine requiring a certain horsepower to be motored to starting speeds and requiring a substantially greater horsepower to be motored to higher operational speeds, and an automatic safety clutch coupling said engine and propeller assembly, said safety clutch comprising a pair of engageable torque transmitting members, spring means normally biasing said members into engagement with a spring force that progressively increases and decreases under progressive deflection in disengagement direction, and means carried by said members responsive to a predetermined torque transmitted through said members for biasing said members out of engagement and into slipping disengagement on motoring said engine through said safety clutch by a horsepower that lies between said first and second mentioned horsepowers so that said engine may be started by said propeller assembly without causing disengagement of said safety clutch, said spring means being arranged to provide an appreciably diminished spring force during slipping disengagement to lessen slipping wear on said members.

4. An aircraft propulsion plant comprising a propeller assembly, a gas turbine engine requiring a certain horsepower to be motored to starting speeds and requiring a substantially greater horsepower to be motored to higher operational speeds, and an automatic safety clutch coupling said engine and propeller assembly, said safety clutch comprising a pair of engageable torque transmitting toothed members, spring means normally biasing said members into positive engagement with a spring force that progressively increases and decreases under progressive deflection in disengagement direction, and means carried by said members responsive to a predetermined torque transmitted through said members for biasing said members out of positive engagement and into ratcheting disengagement on motoring said engine through said safety clutch by a horsepower that lies between said first and second mentioned horsepowers so that said engine may be started by said propeller assembly without causing disengagement of said safety clutch, said spring means being arranged to provide an appreciably diminished spring force during ratcheting disengagement to lessen ratcheting wear on said members.

5. An aircraft propulsion plant comprising a propeller assembly, a gas turbine engine requiring a certain horsepower to be motored to starting speeds and requiring a substantially greater horsepower to be motored to higher operational speeds, and an automatic safety clutch coupling said engine and propeller assembly, said safety clutch comprising a pair of torque transmitting engageable toothed members, spring means normally biasing said members into positive engagement, and helical spline means between said members responsive to a predetermined transmitted torque from said propeller assembly to said engine for biasing said members out of positive engagement and into ratcheting disengagement on motoring said engine through said safety clutch by a horsepower that lies between said first and second mentioned horsepowers so that said engine may be started by said propeller assembly without causing disengagement of said safety clutch.

6. An aircraft propulsion plant comprising a propeller assembly, a gas turbine engine requiring a certain horsepower to be motored to starting speeds and requiring a substantially greater horsepower to be motored to higher operational speeds, and an automatic safety clutch coupling said engine and propeller assembly, said safety clutch comprising a pair of torque transmitting engageable toothed members, spring means normally biasing said members into positive engagement with a spring force that progressively increases and decreases under progressive deflection in disengagement direction, and helical spline means between said members responsive to a predetermined transmitted torque from said propeller assembly to said engine for biasing said members out of positive engagement and into ratcheting disengagement on motoring said engine through said safety clutch by a horsepower that lies between said first and second mentioned horsepowers so that said engine may be started by said propeller assembly without causing disengagement of said safety clutch, said spring means being arranged to provide an appreciably diminished spring force during ratcheting disengagement to lessen ratcheting wear on said members.

7. An aircraft propulsion plant comprising a propeller assembly, a gas turbine engine requiring a certain horsepower to be motored to starting speeds and requiring a substantially greater horsepower to be motored to higher operational speeds, and an automatic safety clutch coupling said engine and propeller assembly, said safety clutch comprising a pair of torque transmitting engageable toothed members, a spring of conical configuration normally biasing said members into positive engagement with a spring force that progressively increases and decreases under progressive deflection in disengagement direction, and helical spline means between said members responsive to a predetermined transmitted torque from said propeller assembly to said engine for biasing said members out of positive engagement and into ratcheting disengagement on motoring said engine through said safety clutch by a horsepower that lies between said first and second mentioned horsepowers so that said engine may be started by said propeller assembly without causing disengagement of said safety clutch, said spring being arranged to provide an appreciably diminished spring force during ratcheting disengagement to lessen ratcheting wear on said members.

8. An aircraft propulsion plant comprising a propeller assembly, a gas turbine engine requiring a certain horsepower to be motored to starting speeds and requiring a substantially greater horsepower to be motored to higher operational speeds, an automatic safety clutch coupling said engine and propeller assembly, said safety clutch comprising a pair of torque transmitting engageable members, spring means normally biasing said members into engagement, means between said members responsive to a predetermined transmitted torque from said propeller assembly to said engine for biasing said members into disengagement on motoring said engine through said safety clutch by a horsepower that lies between said first and second mentioned horsepowers, and a starter motor of lesser horsepower than said third mentioned horsepower for driving said engine through said safety clutch so that said engine may be started by said starter motor without causing disengagement of said safety clutch.

9. An aircraft propulsion plant comprising a propeller assembly, a gas turbine engine requiring a certain horsepower to be motored to starting speeds and requiring a substantially greater horsepower to be motored to higher operational speeds, an automatic safety clutch coupling said engine and propeller assembly, said safety clutch comprising a pair of engageable toothed members, a spring of conical configuration normally biasing said members into positive toothed engagement with a spring force that progressively increases and decreases under progressive deflection in disengagement direction, and helical spline means formed by said toothed members responsive to a predetermined torque transmitted between said propeller assembly and said engine for biasing said members out of positive toothed engagement and into ratcheting disengagement on motoring said engine through said safety clutch by a horsepower that lies between said first and second mentioned horsepowers so that said engine may be started by said propeller assembly without causing disengagement of said safety clutch, said spring being arranged to provide an appreciably diminished spring force during ratcheting disengagement to lessen ratcheting wear on said members, and a starter motor of lesser horsepower than said third mentioned horsepower for driving said engine through said safety clutch so that said engine may be started by said starter motor without causing disengagement of said safety clutch.

10. A power transmission unit comprising an automatic clutch having engageable members for connecting a normally driving shaft with a normally driven shaft, said members being biased to engagement by a spring, pump means responsive to relative rotation between said members for producing a hydraulic pressure furnishing a force acting to oppose engagement of said members by said spring, said members being self-biased to slipping disengagement against said spring by a substantial predetermined torque application to said driving shaft from said driven shaft, said spring being of conical configuration whereby its force diminishes appreciably as said clutch moves from engagement to disengagement to lessen slipping wear, said hydraulic force being less than said spring force during engagement and disengagement but not subject to appreciable decrease during disengagement whereby slipping wear is further lessened.

11. A power transmission unit comprising an automatic clutch having engageable jaw teeth for connecting a normally driving shaft with a normally driven shaft, said jaw teeth being biased to positive engagement by a spring, pump means responsive to relative rotation between said members for producing a hydraulic pressure furnishing a force acting to oppose engagement of said members by said spring, said jaw teeth being helically formed so as to be self-biased out of positive engagement and into ratcheting disengagement against said spring by a substantial predetermined torque application to said driving shaft from said driven shaft, said spring being of conical configuration whereby its force diminishes appreciably as said clutch moves from engagement to disengagement to lessen jaw teeth ratcheting wear, said hydraulic force being less than said spring force during engagement and disengagement but not subject to appreciable decrease during ratcheting disengagement whereby jaw teeth ratcheting wear is further lessened.

References Cited in the file of this patent

UNITED STATES PATENTS

| | | |
|---|---|---|
| 2,057,517 | Finnegan | Oct. 3, 1936 |
| 2,331,077 | Nardone | Oct. 5, 1943 |
| 2,462,824 | Zimmerman et al. | Feb. 22, 1949 |
| 2,490,172 | Swahnberg | Dec. 6, 1949 |
| 2,495,988 | Sheppard | Jan. 31, 1950 |
| 2,581,320 | Burton et al. | Jan. 1, 1952 |
| 2,644,338 | Miller | July 7, 1953 |

FOREIGN PATENTS

| | | |
|---|---|---|
| 625,176 | Great Britain | June 23, 1949 |

UNITED STATES PATENT OFFICE
CERTIFICATE OF CORRECTION

Patent No. 2,893,495                                 July 7, 1959

Charles J. McDowall et al.

It is hereby certified that error appears in the printed specificatic of the above numbered patent requiring correction and that the said Letters Patent should read as corrected below.

Column 1, line 22, after "single" insert -- engine --; column 5, line 5, for "valve" read -- value --; column 7, line 74, for "shaft" read -- valve --; column 9, line 33, for "controls" read -- control --.

Signed and sealed this 1st day of March 1960.

(SEAL)

Attest:

KARL H. AXLINE
Attesting Officer

ROBERT C. WATSON
Commissioner of Patents